US008810863B2

(12) United States Patent
Takahashi

(10) Patent No.: US 8,810,863 B2
(45) Date of Patent: Aug. 19, 2014

(54) IMAGE FORMING APPARATUS, IMAGE PROCESSING METHOD, AND SOFTWARE PROGRAM

(75) Inventor: Satoshi Takahashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 19 days.

(21) Appl. No.: 13/539,615

(22) Filed: Jul. 2, 2012

(65) Prior Publication Data

US 2013/0016402 A1 Jan. 17, 2013

(30) Foreign Application Priority Data

Jul. 15, 2011 (JP) ................................. 2011-156898

(51) Int. Cl.
*H04N 1/40* (2006.01)

(52) U.S. Cl.
USPC .......................................... 358/3.28; 358/468

(58) Field of Classification Search
USPC ................... 358/3.28, 450, 448, 468, 1.9, 2.1
See application file for complete search history.

(56) References Cited

U.S. PATENT DOCUMENTS

| | | | | |
|---|---|---|---|---|
| 5,831,747 | A * | 11/1998 | Salgado | 358/453 |
| 7,085,006 | B2 * | 8/2006 | Yokoyama et al. | 358/1.9 |
| 7,292,356 | B2 * | 11/2007 | Otokita | 358/1.13 |
| 7,400,420 | B2 * | 7/2008 | Kageyama et al. | 358/1.13 |
| 2005/0041263 | A1 | 2/2005 | Ishikawa et al. | |
| 2005/0088701 | A1 | 4/2005 | Uchida et al. | |
| 2005/0219599 | A1 | 10/2005 | White et al. | |
| 2005/0225080 | A1 | 10/2005 | Wicker | |
| 2007/0029394 | A1 | 2/2007 | Wicker et al. | |
| 2007/0201116 | A1 | 8/2007 | Wicker et al. | |
| 2007/0241554 | A1 | 10/2007 | Wicker et al. | |
| 2007/0246930 | A1 | 10/2007 | Wicker | |
| 2007/0248364 | A1 | 10/2007 | Wicker et al. | |
| 2007/0267865 | A1 | 11/2007 | Wicker et al. | |
| 2008/0048433 | A1 | 2/2008 | Wicker et al. | |
| 2009/0001710 | A1 | 1/2009 | Wicker | |
| 2009/0303510 | A1 | 12/2009 | Uchida et al. | |
| 2009/0304228 | A1 | 12/2009 | Ishikawa et al. | |

FOREIGN PATENT DOCUMENTS

| | | | |
|---|---|---|---|
| CN | 1606329 | A | 4/2005 |
| CN | 101600040 | A | 12/2009 |
| EP | 2052529 | A1 | 4/2009 |
| JP | 2005-072777 | A | 3/2005 |
| JP | 2007-179532 | A | 7/2007 |
| JP | 2009-171550 | A | 7/2009 |

OTHER PUBLICATIONS

Chinese Office Action dated May 16, 2014 for corresponding Chinese Application No. 20120245388.2.

* cited by examiner

*Primary Examiner* — Thomas D Lee
*Assistant Examiner* — Stephen M Brinich
(74) *Attorney, Agent, or Firm* — Harness, Dickey & Pierce, P.L.C.

(57) ABSTRACT

An image forming apparatus, having a function of superimposing a pattern on an image based on parameters set for one or more document properties, includes a memory to store an administrator-set parameter and a user-set parameter settable for each one of the document properties of the superimposed pattern; a mode determination unit to identify a pattern superimposing mode from a plurality of pattern superimposing modes; a pattern information obtaining unit to obtain the administrator-set parameter or the user-set parameter for each one of the document properties to be used for superimposing the pattern on the image based on the identified pattern superimposing mode and by referencing a property-mode correlation table correlating each one of the document properties and the plurality of pattern superimposing modes; an image drawing information generator to generate image drawing information for the image superimposed with the pattern; and an image outputting unit to output the image.

6 Claims, 4 Drawing Sheets

| |
|---|
| DOCUMENT PROPERTIES |
| PRINT OF BACKGROUND PATTERN (YES/NO) |
| TYPES OF BACKGROUND PATTERN |
| COLOR OF BACKGROUND PATTERN |
| DENSITY OF BACKGROUND PATTERN |
| TYPES OF MASK PATTERN FOR BACKGROUND PATTERN |
| CONTENTS OF TEXT STRINGS |
| SIZE OF TEXT STRINGS |
| ROTATION ANGLE OF TEXT STRINGS |

FIG. 5

| DOCUMENT PROPERTIES / MODE | ADMINISTRATOR IMPOSING MODE | HOST-PRIORITY MODE | PARTIALLY HOST-PRIORITY MODE |
|---|---|---|---|
| PRINT OF BACKGROUND PATTERN (YES/NO) | IMPOSE ADMINISTRATOR SETTING | PRIORITY ON HOST SETTING | IMPOSE ADMINISTRATOR SETTING |
| TYPES OF BACKGROUND PATTERN | IMPOSE ADMINISTRATOR SETTING | PRIORITY ON HOST SETTING | IMPOSE ADMINISTRATOR SETTING |
| COLOR OF BACKGROUND PATTERN | IMPOSE ADMINISTRATOR SETTING | PRIORITY ON HOST SETTING | IMPOSE ADMINISTRATOR SETTING |
| DENSITY OF BACKGROUND PATTERN | IMPOSE ADMINISTRATOR SETTING | PRIORITY ON HOST SETTING | IMPOSE ADMINISTRATOR SETTING |
| TYPES OF MASK PATTERN FOR BACKGROUND PATTERN | IMPOSE ADMINISTRATOR SETTING | PRIORITY ON HOST SETTING | PRIORITY ON HOST SETTING |
| CONTENTS OF TEXT STRINGS | IMPOSE ADMINISTRATOR SETTING | PRIORITY ON HOST SETTING | PRIORITY ON HOST SETTING |
| SIZE OF TEXT STRINGS | IMPOSE ADMINISTRATOR SETTING | PRIORITY ON HOST SETTING | PRIORITY ON HOST SETTING |
| ROTATION ANGLE OF TEXT STRINGS | IMPOSE ADMINISTRATOR SETTING | PRIORITY ON HOST SETTING | PRIORITY ON HOST SETTING |

FIG. 6

| DOCUMENT PROPERTIES | ADMINISTRATOR SETTING | HOST SETTING |
|---|---|---|
| BACKGROUND PATTERN (YES/NO) | YES | YES |
| ⋮ | ⋮ | ⋮ |
| CONTENTS OF TEXT STRINGS | DO NOT COPY | DOCUMENT CREATED BY ABC CORP. |
| ⋮ | ⋮ | ⋮ |

IMAGE FORMING APPARATUS, IMAGE PROCESSING METHOD, AND SOFTWARE PROGRAM

CROSS-REFERENCE TO RELATED APPLICATION

The present application claims priority to Japanese patent application no. 2011-156898, filed on Jul. 15, 2011, which is incorporated by reference herein in its entirety.

BACKGROUND

1. Technical Field

The present invention relates to an image forming apparatus, an image processing method, and a control software program of an image forming apparatus, and more particularly to control of a background pattern printing to enhance security of output sheets.

2. Description of the Background Art

With the advancement of information digitization, image processing apparatuses such as printers or facsimile machines for outputting digitized information and scanners for digitizing document information have become indispensible apparatuses. Such image processing apparatuses have image capturing, image forming, and communication capabilities, which enable them to function as printers, facsimiles, scanners, copiers, or multi-functional apparatuses combining several of these capabilities and known as multi-functional peripherals (MFP).

Among such image processing apparatuses, there are printers for outputting digitized information that employ a background pattern printing technique that superimposes specific dot patterns or image patterns on printed images to prevent forgery and information leak. Depending on the specific pattern formed on the sheets, these patterns can be detected when someone tries to copy such sheets using certain types of equipment, and prohibits such copying.

Further, even if such sheets are copied by generally available image forming apparatuses, specific patterns such as text strings may appear on the copied sheets due to the difference in recognition level of the specific patterns with respect to other portion. Therefore, such copied sheets can be instantly recognized as copied documents, by which unauthorized copying can be prevented.

Such background pattern printing may be suitably conducted for each printing operation even when different users conduct printing operations. Thus, for example, JP-2007-179532-A discloses a method of determining a suitable content of a background pattern to be superimposed for print jobs to be conducted by different users.

Such background pattern printing can be reliably conducted as follows: Firstly, an image forming apparatus is required to superimpose a background pattern to a print job input to the image forming apparatus, and secondly, the superimposing setting can be changed only by an administrator or the like that has a higher access right. In such a case, general users having limited access right cannot change the settings of the background pattern printing, and cannot change the text strings superimposed as a background pattern. If the limited access right users can change the settings freely, some users may cancel the background pattern printing, by which the background pattern printing is not conducted.

The background pattern printing may be used differently for in-house documents and public documents. For example, text strings superimposed as background pattern may be changed for an in-house document and a public document, such as "NO COPY" for the in-house document, and an outputting date and a name of an output person for the public document.

However, if only the administrator having a higher access right can change the background pattern conditions as described above, such condition change in view of each distribution destination cannot be conducted by general users having limited access right. If the general users want to change the conditions, the general users need to request such change to the administrator each time a document is printed, which is inconvenient.

SUMMARY

In one aspect of the present invention, an image forming apparatus is devised. The image forming apparatus has a function of superimposing a pattern on a target output image when conducting an image outputting process. The pattern is superimposable based on parameters set for one or more document properties. The image forming apparatus includes a memory to store an administrator-set parameter settable for each one of the document properties of the superimposed pattern, and a user-set parameter settable for each one of the document properties of the superimposed pattern; a mode determination unit to identify a pattern superimposing mode, to be used for superimposing the pattern on the target output image, from a plurality of pattern superimposing modes settable for the image forming apparatus, each one of the pattern superimposing modes configurable by using the administrator-set parameter alone, the user-set parameter alone, or a combination of the administrator-set parameter and the user-set parameter; a pattern information obtaining unit to obtain the administrator-set parameter or the user-set parameter for each one of the document properties to be used for superimposing the pattern on the target output image based on the identified pattern superimposing mode and by referencing a property-mode correlation table correlating each one of the document properties and the plurality of pattern superimposing modes; an image drawing information generator to generate image drawing information for the target output image superimposed with the pattern based on the parameter obtained by the pattern information obtaining unit; and an image outputting unit that processes the image drawing information and conducts the image outputting process.

In another aspect of the present invention, an image processing method for an image forming apparatus is devised. The image forming apparatus has a function of superimposing a pattern on a target output image when conducting an image outputting process. The pattern is superimposable based on parameters set for one or more document properties. The method includes storing an administrator-set parameter settable for each one of the document properties of the superimposed pattern; storing a user-set parameter settable for each one of the document properties of the superimposed pattern; identifying a pattern superimposing mode, to be used for superimposing the pattern on the target output image, from a plurality of pattern superimposing modes settable for the image forming apparatus, each one of the pattern superimposing modes configurable by using the administrator-set parameter alone, the user-set parameter alone, or a combination of the administrator-set parameter and the user-set parameter; obtaining the administrator-set parameter or the user-set parameter for each one of the document properties to be used for superimposing the pattern on the target output image based on the identified pattern superimposing mode and by referencing a property-mode correlation table correlating each one of the document properties and the plurality of pattern superimposing modes; generating image drawing information for the target output image superimposed with the pattern based on the parameter obtained by the obtaining step; and processing the image drawing information for outputting the target output image.

In another aspect of the present invention, a non-transitory computer-readable storage medium storing a program that, when executed by a computer, causes the computer to execute an image processing method for an image forming apparatus is devised. The image forming apparatus has a function of superimposing a pattern on a target output image when conducting an image outputting process. The pattern is superimposable based on parameters set for one or more document properties. The method includes storing an administrator-set parameter settable for each one of the document properties of the superimposed pattern; storing a user-set parameter settable for each one of the document properties of the superimposed pattern; identifying a pattern superimposing mode, to be used for superimposing the pattern on the target output image, from a plurality of pattern superimposing modes settable for the image forming apparatus, each one of the pattern superimposing modes configurable by using the administrator-set parameter alone, the user-set parameter alone, or a combination of the administrator-set parameter and the user-set parameter; obtaining the administrator-set parameter or the user-set parameter for each one of the document properties to be used for superimposing the pattern on the target output image based on the identified pattern superimposing mode and by referencing a property-mode correlation table correlating each one of the document properties and the plurality of pattern superimposing modes; generating image drawing information for the target output image superimposed with the pattern based on the parameter obtained by the obtaining step; and processing the image drawing information for outputting the target output image.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 5 shows an example of a property-mode correlation table according to an example embodiment;

FIG. 6 shows an example of a parameter table according to an example embodiment.

Figure 1:
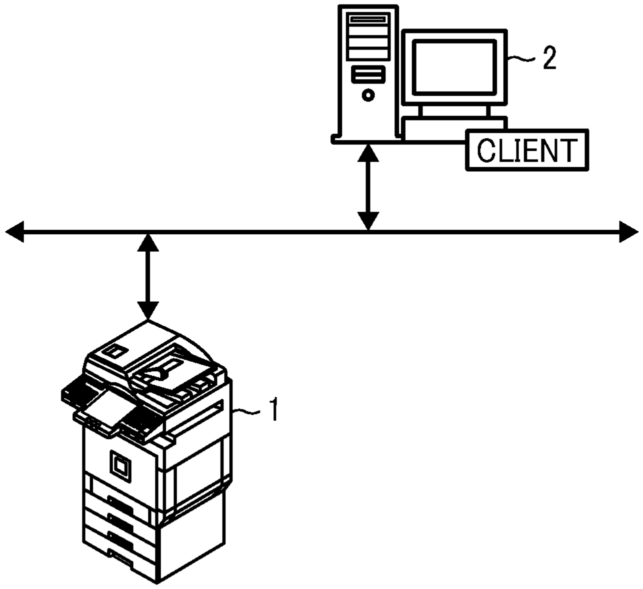
FIG. 1 shows an operating environment of an image forming apparatus according to an example embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION OF EXEMPLARY EMBODIMENTS

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms “a”, “an” and “the” are intended to include the plural forms as well, unless the context clearly indicates otherwise. Moreover, the terms “includes” and/or “including”, when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, an apparatus or system according to an example embodiment is described hereinafter.

In an example embodiment, an image forming apparatus having a function of printing one or more background patterns is described as an example of image forming apparatuses.

FIG. 1 shows an example of an operating environment of an image forming apparatus 1 according to an example embodiment. As shown in FIG. 1, the image forming apparatus 1 is connectable to a host apparatus such as a client terminal 2 via a network. The image forming apparatus 1 may include an image capturing function, an image forming function, and a communication function, by which the image forming apparatus 1 can be configured as a multi-functional apparatus useable as a printer, a facsimile machine, a scanner, and a copier. The image forming apparatus 1 forms and/or outputs images based on a print job received from the client terminal 2. The client terminal 2 is an information processing terminal such as a personal computer (PC) operable by a user. It should be noted that the numbers of the image forming apparatus 1 and the client terminal 2 is not limited and can be changed as required.

Figure 2:
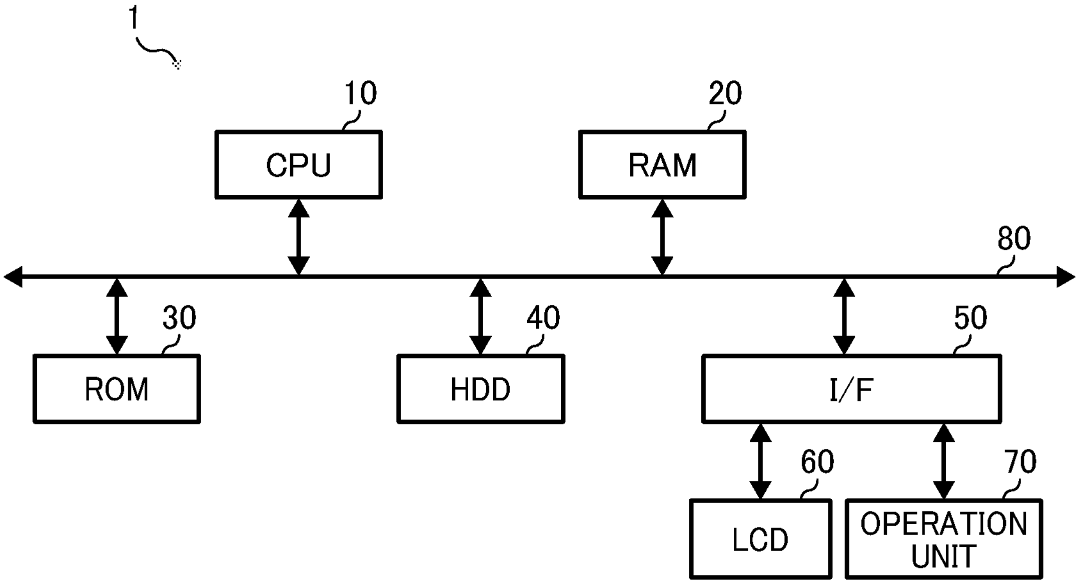
FIG. 2 is a block diagram of a hardware configuration of an image forming apparatus according to an example embodiment.

A description is given of a hardware configuration of the image forming apparatus 1 and the client terminal 2 according to an example embodiment with reference to FIG. 2. Further, as for the image forming apparatus 1, engines for scanner and printer may be added to the hardware configuration shown in FIG. 2. FIG. 2 shows a block diagram of an example hardware configuration of the image forming apparatus 1. The client terminal 2 may have a hardware configuration similar to the image forming apparatus 1.

The image forming apparatus 1 can be configured similarly to general servers, and personal computers (PC). Specifically, the image forming apparatus 1 includes a central processing unit (CPU) 10, a random access memory (RAM) 20, a read only memory (ROM) 30, a hard disk drive (HDD) 40, and an interface (I/F) 50, connectable to each other via a bus 80. Further, the I/F 50 is connectable to a liquid crystal display (LCD) 60 and an operation unit 70.

The CPU 10 is a computing processor or unit which controls the image forming apparatus 1 as a whole. The CPU 10 can be configured with various types of processors, circuits, or the like, such as a programmed processor, a circuit, and an application specific integrated circuit (ASIC), used singly or in combination. The RAM 20 is a volatile memory, to which data or information can be written and read at high speed, and is used as a working memory when the CPU 10 processes data or information. The ROM 30 is a non-volatile memory used as a read only memory, and stores programs such as firmware or the like. The HDD 40 is a non-volatile storage device, to and from which data or information can be written and read, and stores operating system (OS), management or control software programs, application software programs, various data, or the like.

The I/F 50 can be used to connect various types of hardware and network to the bus 80, and controls such connection. The LCD 60 is a user interface to display information, by which the status of the image forming apparatus 1 can be checked by a user. The operation unit 70 is a user interface such as a keyboard, a mouse, etc., by which information can be input to the image forming apparatus 1 by the user.

In such hardware configuration, software programs stored in a storage area such as the ROM 30, the HDD 40, or an optical disk can be read and loaded to the RAM 20, and the CPU 10 runs such programs to control various units, by which a software-executing controller can be configured. With a combination of such software-executing controller and hardware, a functional block to operate the image forming apparatus 1 and the client terminal 2 can be configured. In an example embodiment, at least one of the units is implemented as hardware or as a combination of hardware/software combination.

Figures 3, 4:
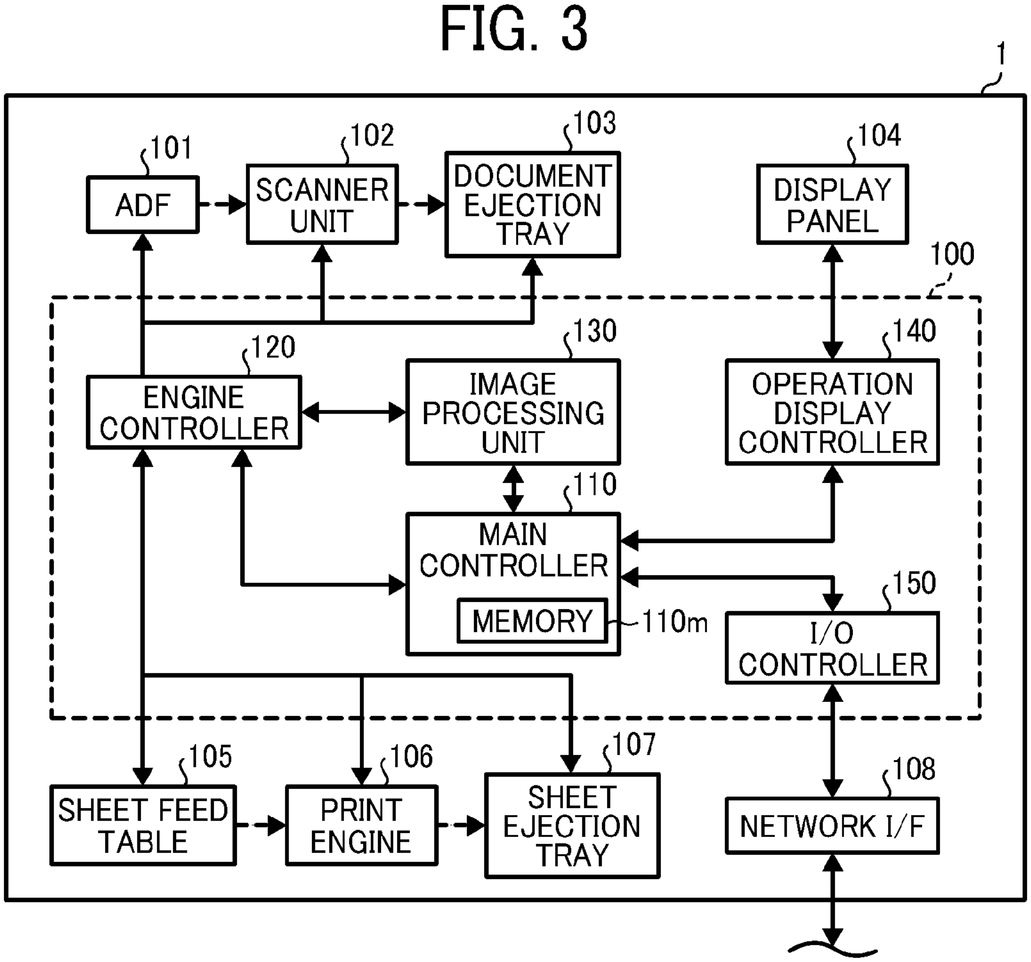
FIG. 3 is a functional block diagram of an image forming apparatus according to an example embodiment.
FIG. 4 shows document property of background pattern printing according to an example embodiment.

A description is given of a functional configuration of the image forming apparatus 1 with reference to FIG. 3, which shows a functional block diagram of the image forming apparatus 1. As shown in FIG. 3, the image forming apparatus 1 may include, for example, a control unit 100, an automatic document feeder (ADF) 101, a scanner unit 102, a document ejection tray 103, a display panel 104, a sheet feed table 105, a print engine 106, a sheet ejection tray 107, and a network interface (I/F) 108. The control unit 100 may substantially correspond to the CPU 10.

Further, the control unit 100 may include, for example, a main controller 110, an engine controller 120, an image processing unit 130, an operation display controller 140, and an input/output (I/O) controller 150. As shown in FIG. 3, the image forming apparatus 1 may be configured as a multi-functional apparatus including the scanner unit 102 and the print engine 106, which may be known as the multi-functional peripherals (MFP). Further, the electrical connections are shown by a solid-line arrow, and the flow of recording sheet or document sheet is shown by a dotted-line arrow in FIG. 3.

The display panel 104 can be used as an output interface, which displays a status of the image forming apparatus 1 by using visual information, and also used as an input interface or operation unit to input information to the image forming apparatus 1 with an operation by a user, in which the display panel 104 may display given images such as icons or the like that can be operated by the user. The display panel 104 may be devised as the LCD 60 and the operation unit 70 as shown in FIG. 2, and may be devised as a touch panel, for example, but not limited thereto. Further, in an environment that a print job management server is connected to a network, a user can select and obtain a print job stored in a print job management server by operating the display panel 104.

The network I/F 108 is used as an interface for the image forming apparatus 1 when the image forming apparatus 1 communicates with other apparatus or devices such as the client terminal 2 or the like via the network. The network I/F 108 may be, for example, Ethernet (registered trademark), universal serial bus (USB) interface, or the like but not limited thereto. The network I/F 108 may be devised as the I/F 50 shown in FIG. 2.

The control unit 100 may be configured as a hardware or a combination of software and hardware. Specifically, one or more software programs stored in a non-volatile memory such as the ROM 30, the HDD 40, and/or an optical disk can be loaded to a volatile memory such as the RAM 20, and the CPU 10 conducts given processing using such programs, by which software-executing controller can be configured, and with a combination of software-executing controller and hardware such as an integrated circuit, the control unit 100 may be an example of a controller to control the image forming apparatus 1 as a whole. The control unit 100 can be configured with various types of processor, circuit, or the like such as a programmed processor, a circuit, an application specific integrated circuit (ASIC), used singly or in combination.

The main controller 110 controls each unit in the control unit 100 by transmitting instructions to each unit. The engine controller 120 can be used as a driver to control and drive the print engine 106, the scanner unit 102, or the like.

The image processing unit 130 prepares or generates image drawing information based on to-be-output image data under the control of the main controller 110. The image drawing information is information used for drawing images when an image forming operation is conducted by the print engine 106. Further, the image processing unit 130 processes data captured and input by the scanner unit 102 to generate image data. Such image data may be stored in a storage area of the image forming apparatus 1 as the scanned data obtained by a scanning process, and can be transmitted to an external information processing apparatus or a storage medium via the network I/F 108.

The operation display controller 140 displays various types of information on the display panel 104, and reports the various information input from the display panel 104 to the main controller 110. The input/output (I/O) controller 150 inputs information, which is input via the network I/F 108, to the main controller 110. Further, the main controller 110 controls the I/O controller 150 to access the client terminal 2, and other devices via the network I/F 108 and the network such as public communication line.

When the image forming apparatus 1 is operated as a printer, the I/O controller 150 receives a print job via the network I/F 108 at first. Then, the I/O controller 150 transfers the received print job to the main controller 110. Upon receiving the print job, the main controller 110 controls the image processing unit 130 to generate image drawing information based on document information or image data included in the print job.

The document information or image data included in the print job may be, for example, page description language (PDL) data. The image processing unit 130 prepares or generates bitmap data as image drawing data from the PDL data, wherein the engine controller 120 controls the print engine 106 to conduct an image forming operation based on the bitmap data. Further, the image processing unit 130 can process data using a given print setting such as print job language (PJL).

When the image processing unit 130 generates image drawing information, the engine controller 120 controls the print engine 106 to conduct an image forming operation to a sheet, transported from the sheet feed table 105, based on the generated image drawing information. As such, the image processing unit 130, the engine controller 120, and the print engine 106 may be collectively referred to as an image forming unit or image outputting unit which can be used for forming or outputting images. Specific configuration of the print engine 106 may employ, for example, an image forming mechanism using the inkjet method or an image forming mechanism using the electrophotography but not limited thereto. The sheet having received the image forming operation by using the print engine 106 may be ejected to the sheet ejection tray 107.

When the above described image forming apparatus 1 receives a print job from the client terminal 2, the image forming apparatus 1 can output images based on the received print job by determining types of background pattern printing such as determining what pattern is to be superimposed on a target output image. In an example embodiment, conditions of background patterns to be superimposed to the target output image can be set when each time the target output image is output.

A description is given of a process of setting printing conditions for background pattern printing according to an example embodiment. When a user transmits a print job to the image forming apparatus 1 from the client terminal 2, the user can select parameters for each document property used for background pattern printing, and can assign the selected document property for the print job. Further, the main controller 110 of the image forming apparatus 1 can store parameters for each document property for the background pattern printing set by an administrator or the like. FIG, 4 shows one example list of document properties for background pattern printing settable to the image forming apparatus 1. The document properties may be, for example, "print of background pattern (yes/no)", "types of background pattern printing", "color of background pattern", and "density of background pattern," and the host setting is given priority and applied to "types of mask pattern for background pattern," "contents of text strings," "size of text strings," and "rotation angle of text strings," but not limited these. The print of background pattern (yes) means the superimposed pattern is required to print (print-required), and the print of background pattern (no) means the superimposed pattern is not required to print (print-not-required).

Each of the document properties (FIG, 4) can be assigned with parameters, input and/or selected by an administrator of the image forming apparatus 1 by operating the display panel 104, and such parameters can be stored in the main controller 110 of image forming apparatus 1. Further, other parameters can be set for each document property when a print job is to be conducted by each user. Examples of parameters are shown in FIG. 6.

The image forming apparatus 1 may include a mode selector or mode determination unit to select background-printing modes, wherein each of the background-printing modes may set parameters differently. Specifically, the background-printing modes may include, for example, three modes such as "administrator imposing mode (i.e., compulsory mode)", "host-priority mode", and "partially host-priority mode."

As such, the parameters of document property for background pattern printing can be set differently, and it can be determined which parameters are applied for the concerned document property, in which the parameters of document property may be classified in administrator-set parameter and user-set parameter. The administrator-set parameters may be set to or selected for the image forming apparatus 1 by an administrator having a higher access right, and the user-set parameters may be set to or selected for the image forming apparatus 1 by a user that conducts each print job.

The background-printing modes for background pattern printing can be selected, and stored in the main controller 110 of the image forming apparatus 1 by only the administrator, which means such background-printing modes themselves are not set to the image forming apparatus 1 from the client terminal 2.

The image processing unit 130 generates image drawing information in view of parameters of each document property, wherein the parameters of each document property are used when to form a background pattern such as a superimposed pattern/text. The image processing unit 130 determines which mode is to be used by selecting one mode from the background-printing modes.

Specifically, in view of the selected modes to be used for background-printing, the image processing unit 130 determines whether what parameter is applied for each document property, wherein such parameter may be set for each print job, or may be set by the administrator as default parameter, which can be used for background pattern printing whenever image forming operations are conducted in view of information security. Hereinafter, the parameters set for each print job may be referred to as host setting, and the parameters set by the administrator may be referred to as administrator setting that may be set as default setting of the image forming apparatus 1.

To determine such parameters, as shown in FIG. 5, the image processing unit 130 stores a property-mode correlation table which correlates host setting/administrator setting and each mode of the background-printing modes. Based on the property-mode correlation table, it can determine whether the host setting or administrator setting is applied for each document property. As above mentioned, the host setting can be set or selected by a user, and thereby the host setting may be also referred to as "user setting."

As shown in FIG. 5, in the administrator imposing mode, the administrator setting stored in the main controller 110 of the image forming apparatus 1 is compulsory applied to all document properties, and thereby all host settings that may be included in a print job are ignored, and thereby not used.

Further, in the host-priority mode, the host setting included in a print job is given priority and applied to all document properties. If a host setting is present for a document property of background pattern printing, the host setting is given priority and applied. If a host setting is not present for a document property of background pattern printing, the administrator setting is applied instead.

Further, in the partially host-priority mode, the administrator setting is compulsory applied to a part of document property for background pattern printing, and the host setting is given priority and applied for another part of document property for background pattern printing. For example, as shown in FIG. 5, in the partially host-priority mode, the administrator setting is compulsory applied to "print of background pattern (yes/no)", "types of background pattern printing", "color of background pattern", and "density of background pattern," and the host setting is given priority and applied to "types of mask pattern for background pattern," "contents of text strings," "size of text strings," and "rotation angle of text strings," wherein the text strings may be warning text strings such as "NO COPY."

As above described, the property-mode correlation table (FIG. 5) may be stored in the image processing unit 130 because the image processing unit 130 refers to such property-mode correlation table when to determine parameters of each document property in view of the background-printing modes. Further, the property-mode correlation table can be stored in the main controller 110 or other unit, in which the image processing unit 130 refers to the property-mode correlation table stored in the main controller 110 or other unit.

The main controller 110 may include a memory 110*m* that can store the parameter table (FIG. 6) for each document property by storing the administrator settings set by the administrator and the host settings settable for each print job. FIG. 6 shows an example of the parameter table, in which each document property for background pattern printing is set with the administrator setting or host setting parameter. As such, the main controller 110 may include a function of an administrator setting storing unit and a host (or user) setting storing unit using the memory 110*m*. It should be noted that the storage of administrator setting and host setting is not limited to the memory 110*m* of the main controller 110*a*, but the administrator setting and host setting can be stored in other memory as required.

When the image forming apparatus 1 is activated, or when the parameter setting is changed via the display panel 104, the main controller 110 updates parameters of administrator setting and stores the updated administrator setting. Such parameters can be stored in a non-volatile storage device such as a non-volatile RAM (NVRAM) which can retain data even when a power-supply to the image forming apparatus 1 is OFF. Further, when the image forming apparatus 1 is activated, such parameters can be read to the RAM 20, and then used to configure the parameter table shown in FIG. 6.

Before the image forming apparatus 1 conducts a print job for the first time, the parameter of host setting (FIG. 6) is vacant, which means "null". When the main controller 110 obtains a print job via the I/O controller 150, the main controller 110 obtains a host setting included in the print job and updates the host setting included in the parameter table (FIG. 6). Further, when the image forming apparatus 1 is activated, the parameter of administrator setting can be copied and set instead of the host setting, as required.

The parameters for background pattern printing included in a print job can be set to the parameter table as follows. For example, the main controller 110 obtains parameters included in a print job described by printer job language (PJL), and sets the parameters included in the print job to the parameter table before instructing the image processing unit 130 to generate image drawing information. Further, some parameters of document properties cannot be changed using parameters transmitted from the client terminal 2. In such a case, the main controller 110 ignores such parameters included in the print job.

When the image processing unit 130 prepares or generates image drawing information based on a print job such as PDL data under the control of the main controller 110, the image processing unit 130 obtains one mode from the background-printing modes from the main controller 110. Then, the image processing unit 130 refers the property-mode correlation table (FIG. 5) based on the obtained one mode, and checks and determines the mode that designates parameters to be used for the background pattern printing. As such, the image processing unit 130 functions as a mode determination unit. Based on the determined mode, the image processing unit 130 obtains parameter of each document property from the parameter table (FIG. 6) stored in the main controller 110. As such, the image processing unit 130 functions as a pattern data obtaining unit.

For example, if the partially host-priority mode is selected as the mode for the background pattern printing, based on parameters (FIG. 6) of document property set for the partially host-priority mode, the image processing unit 130 obtains the administrator setting for "print of background pattern (yes/no)", "types of background pattern printing", and "color of background pattern", "density of background pattern" while obtaining the host setting for "types of mask pattern of background pattern", "contents of text strings", "size of text strings", and "rotation angle of text strings."

Further, if the administrator imposing mode (i.e., compulsory mode) is selected as the mode for the background pattern printing, the image processing unit 130 obtains the administrator setting for all document properties based on parameters (FIG. 6) of document property set for the administrator imposing mode.

Further, if the host-priority mode is selected as the mode for the background pattern printing, the image processing unit 130 checks whether a host setting is already present for each document property at first. If the host setting is present, the image processing unit 130 obtains parameters set for the host setting, and if the host setting is not present, the image processing unit 130 obtains parameters set for the administrator setting.

For example, when parameters are set as shown in FIG. 6, the image processing unit 130 obtains the text strings of "DO NOT COPY" for the contents of text strings when the administrator imposing mode is used, while the image processing unit 130 obtains the text strings of "Document created by ABC corp." for the contents of text strings when the host-priority mode or partially host-priority mode is used.

Figure 7:
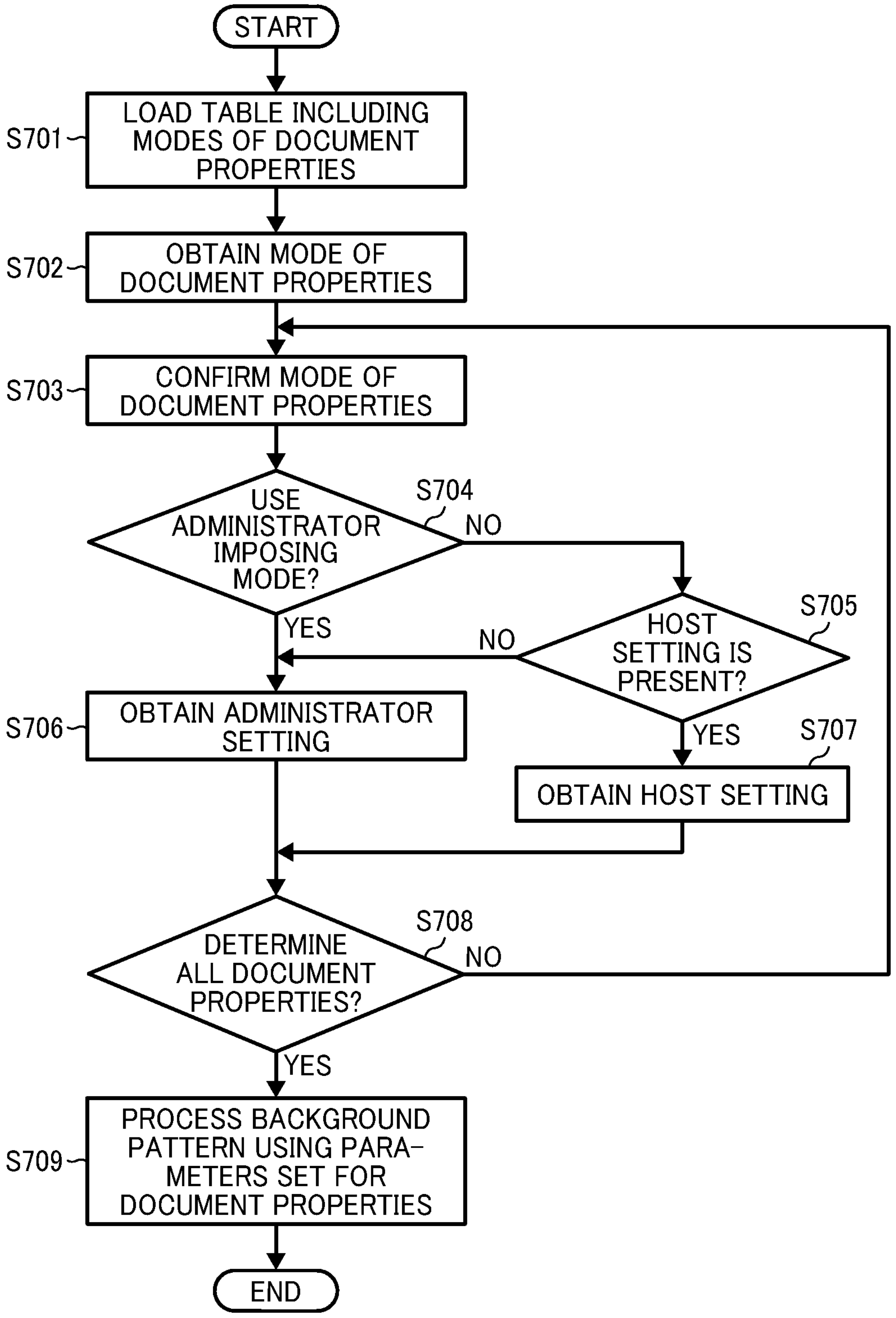
FIG. 7 is a flow chart of a process executed by an image forming apparatus.

A description is given of operation of the main controller 110 and the image processing unit 130 when a print job is input to the image forming apparatus 1 with reference to FIG. 7, which is a flow chart of an operation executed by the main controller 110 and the image processing unit 130.

Upon receiving a print job through the I/O controller 150, the main controller 110 controls the image processing unit 130 to prepare or generate image drawing information. Under the control of the main controller 110, the image processing unit 130 activates its operation, and loads the property-mode correlation table shown in FIG. 5 (step S701), and then obtains a mode from the main controller 110 (step S702), wherein the obtained mode may be set automatically or manually (e.g., user input operation).

Based on the obtained mode, the image processing unit 130 checks or confirms the property-mode correlation table to determine parameters of each document property used for background pattern printing corresponding to the obtained mode (step S703).

If the check result of step S703 indicates that the concerned document property is required to be set with the administrator setting because the administrator imposing mode is selected as the mode (step S704: Yes), the image processing unit 130 obtains the administrator setting from the parameter table (FIG. 6) stored in the main controller 110 (step S706).

If the check result of step S703 indicates that the concerned document property is given with a priority to host setting (step S704: No), the image processing unit 130 checks whether the host setting is present for the concerned document property in the parameter table stored in the main controller 110 (step S705).

If the check result of step S707 indicates that the host setting is not present (step S705: No), the image processing unit 130 obtains the administrator setting (step S706). If the check result of step S707 indicates that the host setting is present (step S705: Yes), the image processing unit 130 obtains the host setting (step S707).

The image processing unit 130 repeats the process of steps S704 to S706, and/or the process of steps S704 to step S707 for every one of document properties to be used for background pattern printing (step S708). When the image processing unit 130 completes the process of steps S704, S705, and S706, or the process of steps S704, S705, and S707 for every one of document properties (step S708: Yes), the image processing unit 130 conducts the background pattern processing based on the obtained parameters for each one of document properties (step S709). As such, the image processing unit 130 functions as an image drawing information generator. With such processing, the background pattern processing for the image forming and/or outputting operation can be completed.

The background pattern processing at step S709 can be conducted using known methods. For example, in one method, PDL data is corrected in line with the obtained parameters of document property, and then image drawing information is generated based on the corrected PDL data as similar to the typical image drawing process. In another method, when preparing or generating image drawing information based on PDL data, image drawing information superimposed with a background pattern can be prepared or generated by referencing the obtained parameters of document property.

As such, the image processing unit 130 stores the property-mode correlation table indicating whether administrator setting or host setting is set for each one of document properties used for background pattern printing. Based on the property-mode correlation table, it can be determined whether the administrator setting or host setting is applied to each one of document properties used for the background pattern printing. Then, based on the mode set for the image forming apparatus 1 by the main controller 110, it can be determined whether the administrator setting or host setting is applied to each one of document properties used for the background pattern printing.

For example, if the administrator imposing mode is applied for "print of background pattern (yes/no)," "types of background pattern printing", "color of background pattern", and "density of background pattern," the parameters set by the administrator to the image forming apparatus 1 is set to each document property. With such setting, when a printing operation is conducted, a background pattern printing operation is conducted using the administrator setting for the density of background pattern, and area of superimposing background pattern.

In contrast, if the host setting is given of priority and applied for "types of mask pattern of background pattern", "contents of text strings", "size of text strings", and "rotation angle of caution text strings," the types of superimposed background pattern and contents of text strings is set using the host setting or user-setting, wherein the parameters of each property can be changed and set by each user. Therefore, as for the image forming apparatus 1 according to an example embodiment, the background pattern printing can be effectively conducted while allowing each user to partially change parameters of each document property when conducting the background pattern printing.

As such, without affecting the effectiveness of background pattern printing, each user can modify the settings such as parameters used for the background pattern printing.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a Wireless Application Protocol (WAP) or 3G-compliant phone) and so on. Since the present invention can be implemented as software, each and every aspect of the present invention thus encompasses computer software implementable on a programmable device.

The computer software can be provided to the programmable device using any storage medium or carrier medium for storing processor readable code such as a flexible disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, work station) may control an information processing apparatus or an image processing apparatus such as image forming apparatus using a computer-readable program, which can execute the above-described processes or steps. In the above described embodiments, at least one or more of the units of apparatus can be implemented in hardware or as a combination of hardware/software combination. In example embodiment, processing units, computing units, or controllers can be configured with using various types of processors, circuits, or the like such as a programmed processor, a circuit, an application specific integrated circuit (ASIC), used singly or in combination.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An image forming apparatus having a function of superimposing a pattern on a target output image when conducting an image outputting process, the pattern superimposable based on parameters set for one or more document properties, the image forming apparatus comprising:

a memory to store an administrator-set parameter settable for each one of the document properties of the superimposed pattern, and a user-set parameter settable for each one of the document properties of the superimposed pattern;

a mode determination unit to identify a pattern superimposing mode, to be used for superimposing the pattern on the target output image, from a plurality of pattern superimposing modes settable for the image forming apparatus, each one of the pattern superimposing modes configurable by using the administrator-set parameter alone, the user-set parameter alone, or a combination of the administrator-set parameter and the user-set parameter;

a pattern information obtaining unit to obtain the administrator-set parameter or the user-set parameter for each one of the document properties to be used for superimposing the pattern on the target output image based on the identified pattern superimposing mode and by referencing a property-mode correlation table correlating each one of the document properties and the plurality of pattern superimposing modes;

an image drawing information generator to generate image drawing information for the target output image superimposed with the pattern based on the parameter obtained by the pattern information obtaining unit; and an image outputting unit that processes the image drawing information and conducts the image outputting process.

2. The image forming apparatus of claim 1, wherein the property-mode correlation table includes information for designating which one of the administrator-set parameter and user-set parameter is set for each one of the document properties for each one of the plurality of pattern superimposing modes, wherein, based on the pattern superimposing mode identified by the mode determination unit and referencing the property-mode correlation table, the pattern information obtaining unit obtains the administrator-set parameter or the user-set parameter for each one of the document properties, corresponding to the identified pattern superimposing mode, to be used for superimposing the pattern on the target output image.

3. The image forming apparatus of claim 1, wherein the document property includes print-required or print-not-required of the superimposed pattern, and contents of the superimposed pattern.

4. The image forming apparatus of claim 3, wherein the document property includes contents of text strings used as the superimposed pattern.

5. An image processing method for an image forming apparatus having a function of superimposing a pattern on a target output image when conducting an image outputting process, the pattern superimposable based on parameters set for one or more document properties, the method comprising:

storing, by at least one processor, an administrator-set parameter settable for each one of the document properties of the superimposed pattern;

storing, by the at least one processor, a user-set parameter settable for each one of the document properties of the superimposed pattern;

identifying, by the at least one processor, a pattern superimposing mode, to be used for superimposing the pattern on the target output image, from a plurality of pattern superimposing modes settable for the image forming apparatus, each one of the pattern superimposing modes configurable by using the administrator-set parameter alone, the user-set parameter alone, or a combination of the administrator-set parameter and the user-set parameter;

obtaining, by the at least one processor, the administrator-set parameter or the user-set parameter for each one of the document properties to be used for superimposing the pattern on the target output image based on the identified pattern superimposing mode and by referencing a property-mode correlation table correlating each one of the document properties and the plurality of pattern superimposing modes;

generating, by the at least one processor, image drawing information for the target output image superimposed with the pattern based on the parameter obtained by the obtaining step; and processing, by the at least one processor, the image drawing information for outputting the target output image.

6. A non-transitory computer-readable storage medium storing a program that, when executed by a computer, causes the computer to execute an image processing method for an image forming apparatus having a function of superimposing a pattern on a target output image when conducting an image outputting process, the pattern superimposable based on parameters set for one or more document properties, the method comprising:

storing an administrator-set parameter settable for each one of the document properties of the superimposed pattern;

storing a user-set parameter settable for each one of the document properties of the superimposed pattern;

identifying a pattern superimposing mode, to be used for superimposing the pattern on the target output image, from a plurality of pattern superimposing modes settable for the image forming apparatus, each one of the pattern superimposing modes configurable by using the administrator-set parameter alone, the user-set parameter alone, or a combination of the administrator-set parameter and the user-set parameter;

obtaining the administrator-set parameter or the user-set parameter for each one of the document properties to be used for superimposing the pattern on the target output image based on the identified pattern superimposing mode and by referencing a property-mode correlation table correlating each one of the document properties and the plurality of pattern superimposing modes;

generating image drawing information for the target output image superimposed with the pattern based on the parameter obtained by the obtaining step; and processing the image drawing information for outputting the target output image.

* * * * *